March 26, 1935.  S. E. B. SODERBERG  1,995,826
PRESSURE REDUCING VALVE
Filed Nov. 28, 1933
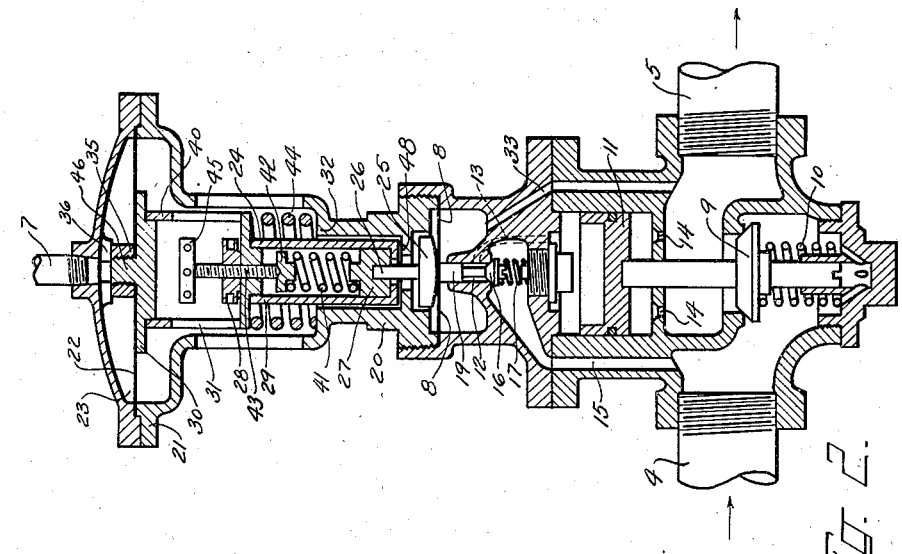
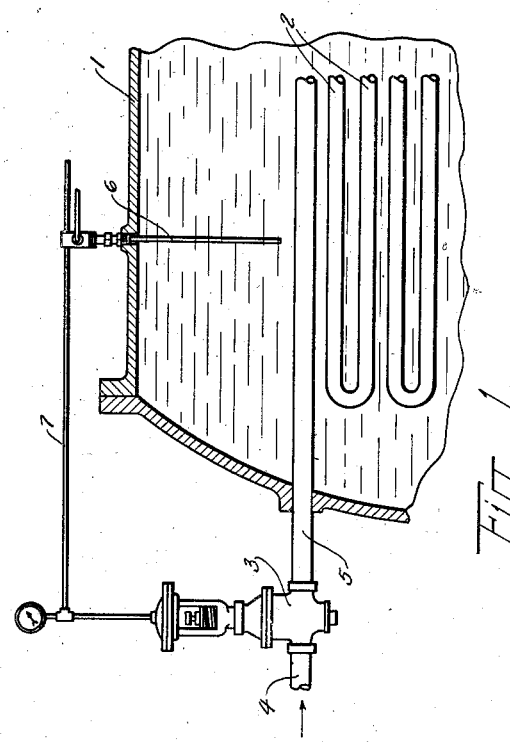
INVENTOR
Sten E. B. Soderberg
BY
O. V. Thire
ATTORNEY Patented Mar. 26, 1935

1,995,826

UNITED STATES PATENT OFFICE 1,995,826

PRESSURE REDUCING VALVE

Sten E. B. Soderberg, Passaic, N. J., assignor to Leslie Company, Lyndhurst, N. J.

Application November 28, 1933, Serial No. 700,064

3 Claims. (Cl. 236—80)

The present invention relates to devices for governing the admission of heating fluid to a heating device in installations where liquids or fluids are to be heated to a constant temperature. A typical installation of this sort is represented by the case of a drum holding water which is to be heated to a constant temperature for use for any desired purpose, the heating being done by means of steam and, in the form used herein for illustrative purposes, by means of a coil arranged inside of the drum.

A pressure reducing valve for use in such an installation is described and claimed in combination with other elements in my co-pending application, Serial Number 625,309. The present invention relates to similar installations but provides a further desirable feature in the pressure reducing valve.

The invention is illustrated in the accompanying drawing, in which Fig. 1 shows a water drum, portions of which are broken away, heated by means of a steam coil supplied with steam from a high pressure source, the flow to the coil being controlled by a thermostatically controlled pressure reducing valve in accordance with the present invention, and Fig. 2 shows the pressure reducing valve in central longitudinal section.

The drum containing the water to be heated is shown at 1, the coil by means of which the water is to be heated appearing at 2 and the pressure reducing valve being shown at 3. The source of high pressure steam is not illustrated, but such steam is supplied from such source to the pressure reducing valve by means of the pipe 4, the steam whose pressure has been reduced being conveyed to the coil 2 from the valve 3 by means of the pipe 5. It is desired to keep the temperature of the water in drum 1 at as nearly constant a temperature as feasible. A thermostatic element extending into the body of water is shown at 6. The action of this element and the associated parts results in a variable pressure at pipe 7. This is fully described in the co-pending application referred to above and will not be repeated here as it forms no part of the present invention. The pressure in pipe 7 falls with an increase in the temperature. This is the result of the specific thermostatic apparatus employed. As will be understood from a reading of the following description of the apparatus and its action, a thermostatic arrangement could be employed in which the pressure rises with the temperature. Such an element is also shown in the prior application, and the modification of the present device required for such a case will be obvious.

The arrangement described and claimed in the said co-pending application results in a constant reduced pressure in the coil 2 for any given temperature of the water irrespective of the pressure of the steam delivered to the pressure reducing valve. This is a great advance over prior devices but it has been found in practice that for the sake of safety it is advisable to add a further pressure reducing valve to the system. The coil and the drum 1 are calculated for such pressures as are actually to be used and these pressures will usually be much lower than the pressure of the steam supplied to the valve 3. Thus, the steam delivered to the valve 3 by pipe 4 may come from a boiler generating steam for power purposes and may be 200# per sq. in. or more, while in the coil 2 the maximum steam pressure desired for heating purposes may be something like 5# per sq. in. This involves the danger that, the valve being controlled in response to the temperature of the water only, it will under some conditions admit full pressure steam to the coil 2. For this reason it has in practice proved advisable to insert a further pressure reducing valve, preferably ahead of the pressure reducing valve 3, to reduce the pressure down to a point slightly above the maximum desired in coil 2. The cost of this second pressure reducing valve is an objection and the present invention is intended to provide this safety feature without the use of such additional pressure reducing valve. This is done by modifying the valve 3 from the form shown in said former application.

The parts of the valve below diaphragm 8 remain as before, the modification being introduced in the mechanism above this diaphragm.

The valve controlling the flow of steam from the pipe 4 to the pipe 5 is shown at 9. A light spring 10 urges it toward its seat and pressure above the piston 11 tends to open it further. This pressure is admitted to the space above piston 11 from the annular space 12 around the stem of pilot valve 16 by means of the duct 13. The space on the lower side of piston 11 is in communication with pipe 5 by means of openings 14—14 and the pressure on the lower side is added to the force of the spring 10 to oppose the pressure on the upper side. Pressure medium from pipe 4 is admitted to the annular space 12 through the duct 15, its admission being controlled by the pilot valve 16. This pilot valve is urged towards its seat by the spring 17 and is forced off its seat by the diaphragm 8 pressing on the upper end of the stem 19. Steam leaking past the stem 19 escapes by way of duct 33 to the low-pressure pipe 5. All of this is of the usual construction.

The diaphragm 8 is clamped into place by the housing 20, which terminates at its upper end in a flange 21 against which is clamped a diaphragm 22 with a diaphragm chamber 23 on its upper side.

Pressure from pipe 7, varying with the temperature of the water in the tank to be heated as described above, is admitted into the diaphragm chamber 23.

Extending between the two diaphragms 8 and 22 is a structure for transmitting movement which will be described next.

At the upper end of this structure is the circular disk 30 which is clamped against diaphragm 22 by means of its threaded stem 46 extending through a central opening in the diaphragm and nut 35 screwed on this stem. The lower side of disk 30 has a cylindrical central projection fitting snugly into the upper end of the cylindrical box 40, whose lower end has a short stem 24 screwed into the upper end of hollow stem 29. Within the hollow stem 29 there is a plug 27 into which extends the stem 26 of foot 25, which bears against diaphragm 8. Plug 27 is urged downward toward the bottom of hollow stem 29 by spring 41, whose upper end abuts against a plug 42. The upper side of this plug 42 bears against the lower end of adjusting screw 43 which is threaded through the bottom of box 40 and which is provded with a lock-nut 28. Lock-nut 28 and the head 45 of adjusting screw 43 are accessible through lateral openings 31 in box 40. The compression of spring 41 can thus be adjusted.

Box 40 is pressed upward by spring 44 whose lower end abuts against shoulder 32 in housing 20.

The lower end of hollow stem 29 will upon sufficient downward movement abut against shoulder 48 of housing 20, as described below.

Stem 46 and nut 35 form a stop to abut against spaced stops 36 thereby to limit the upward movement of diaphragm 22.

For a given temperature of the water in drum 1 there will be delivered into the diaphragm chamber 23 fluid at a certain corresponding pressure. Any downward movement of diaphragm 22 will be transmitted to diaphragm 8 by the movement-transmitting structure described above, beginning with disk 30 and ending with foot 25. Diaphragm 8 will in turn transmit it to pilot valve 12 and will open this pilot valve against the pressure of spring 17. Spring 41 keeps plug 27 against its stop at the bottom of the hollow interior of stem 24 during such operation. As a result a definite amount of steam will be delivered through duct 13 to the chamber above the piston 11. The leakage from this chamber past the piston 11 will result in a definite pressure above the piston and this in turn will tend to give a definite position to the valve 9 and hence a definite pressure in pipe 5 and coil 2. The pressure in chamber 23 is however not the only factor determining the position of valve 9. The rate at which the steam in the coil is condensed at once and directly affects the pressure in the coil and therefore on the under side of diaphragm 8 and on the lower side of piston 11. This will result in the usual way in a change in the position of valve 9. Thus, if water is taken from tank 1 at an increased rate, the drop in temperature will cause a rise in the pressure in chamber 23 and at the same time the more rapid condensation in coil 2 will result in a drop of the pressure in the coil and on the lower side of piston 11 and diaphragm 8. Pilot valve 16 will open further and admit more steam to the chamber above the piston 11 thereby opening valve 9 farther. The net result is that a definite pressure in pipe 5 and coils 2 will be maintained responsive to the temperature of the water in tank 1.

As the pressure in chamber 23 falls, spring 44 forces the diaphragm 22 upward, and in order to prevent injury to the diaphragm its upward motion is limited by the stem 34 and nut 35 which come into contact with the stops 36 when the permissible amount of upward motion has occurred. The stiffness of the spring and size of the diaphragm are such that this will occur when the pressure in chamber 23 is about atmospheric.

Upward pressure on the lower side of diaphragm 8 will tend to compress spring 41, the position of diaphragm 22 being substantially uninfluenced. This constitutes a safety feature, pressure above a selected point in pipe 5 being prevented. Such excessive pressure closes pilot valve 16 and this shuts off valve 9. In general, an increase of pressure in coil 2 results in a throttling of the pilot valve and a resultant closing movement of valve 9. Spring 41 is so selected and its compression so adjusted by means of screw 43 that when stem 29 engages shoulder 48 in housing 20, the spring is compressed just sufficiently to balance the upward force of the desired maximum reduced pressure acting on diaphragm 8. Any increase in this pressure will compress spring 41 at once and throttle the pilot valve and main valve 9.

The theory and action of the device may be further elucidated as follows:

In normal operation, spring 41 holds plug 27 against the bottom of hollow stem 29 and the impulse-transmitting structure beginning with disk 30 and ending with foot 25 acts as one rigid piece. The action of the device is then the same as in the prior device described more fully in my former application. If now a sudden drop in the temperature of the liquid in container 1 occurs from any cause, the pressure in chamber 23 will rise and in addition the pressure in coils 2 will drop because of accelerated condensation of the heating medium. If both of these are allowed to act to their full extent, the valve 9 will open wide and allow the pressure in coils 2 to exceed the safe limit. To avoid this, the distance to which diaphragm 22 is permitted to force down hollow stem 29 is limited by having the end of the stem abut against the annular shoulder 48. As long as this condition remains, the movement of the lower diaphragm is dependent only on the pressure on its lower side and the opposing pressure of spring 41, and the apparatus works like the usual single-diaphragm reduction valve. The pressure in coils 2 is then limited to some desired low pressure, its exact amount being regulable by setting of set-screw 43. There is therefore no danger of excessive pressures in the coils.

It will be noted upon analyzing this matter, that for this action the following features are required: (a) an element (30) abutting against diaphragm 22; (b) an element (25) (which may be unitary with plug 27) abutting against diaphragm 8; (c) a compression spring (41) forcing these two elements apart; (d) means to limit the distance to which the spring can force them apart (this limit being furnished by the bottom of hollow stem 29 being engaged by plug 27); and (e) a stop for the downward movement of the element abutting against diaphragm 22 (this stop being shoulder 48).

It will be seen from the above that the modification made by me in this pressure reducing valve acts in the nature of a safety device. The valve will act normally as in the prior co-pending application, but as the pressure in the heating coils approaches the upper limit of safety, the present modification results in a throttling action of the valve, regardless of the temperature of the water; and when the limit is reached it shuts off the steam completely.

It will be obvious that instead of heating coils being used, the steam might be injected directly into the water. The action of the apparatus would be just as described. Some other changes will no doubt be possible in practicing my invention without a departure from its spirit.

What I claim is:

1. In apparatus of the class described in which steam to heat water in a container is led through a reducing valve, said reducing valve having a main control valve whose position is governed by the position of a pilot valve and a pair of diaphragms the position of one of which determines the position of the pilot valve, the position of said first diaphragm being generally influenced by the position of the second diaphragm and the position of the second diaphragm being influenced by the temperature of the water, being forced toward the first diaphragm as the temperature of the water falls; the combination of an element in contact with the first diaphragm, an element in contact with the second diaphragm, a spring tending to force the two elements apart, a stop limiting the distance to which they can be forced apart, and a stop limiting the motion of the element engaging the second diaphragm in the direction toward the first diaphragm.

2. Apparatus according to claim 1, the two diaphragms being parallel and opposite each other, the two elements engaging the diaphragms on the sides facing each other, the first stop being provided by a part of one of the elements engaging a part of the other element, and the second stop being provided by a fixed abutment engaged by the second element.

3. In apparatus of the class described in which steam to heat water in a container is led through a reducing valve, said reducing valve having a main control valve whose position is governed by the position of a pilot valve and a pair of parallel horizontal diaphragms facing each other the position of one of which determines the position of the pilot valve, the position of the first diaphragm being generally influenced by the position of the second diaphragm, and the position of the second diaphragm being responsive to the temperature of the water approaching the second diaphragm more as the temperature falls; the combination of an element engaging the lower side of the upper diaphragm and having a hollow stem, an element engaging the upper side of the lower diaphragm and comprising a portion reciprocable in said hollow stem, a spring engaging said portion and said first named element so as to resiliently force them each toward its associated diaphragm, the hollow stem having a stop limiting the extent of said motion, and a stop fixed relatively to the diaphragms limiting the motion of said first-named element toward the lower diaphragm.

STEN E. B. SODERBERG.